United States Patent [19]

Solum et al.

[11] Patent Number: 5,167,833

[45] Date of Patent: Dec. 1, 1992

[54] ROTARY DISTRIBUTOR/AUXILIARY BACKUP DRIVE MECHANISM FOR TRICKLING FILTER SYSTEMS

[75] Inventors: Dallas H. Solum, Salt Lake City; Bruce C. Deming, Murray, both of Utah

[73] Assignee: Baker Hughes Incorporated, Houston, Tex.

[21] Appl. No.: 750,916

[22] Filed: Aug. 28, 1991

[51] Int. Cl.$^5$ .......................... C02F 3/04; B01D 21/34
[52] U.S. Cl. ....................................... 210/739; 210/91; 210/145; 210/150; 210/614; 210/617
[58] Field of Search ................. 210/85, 143, 145, 150, 210/151, 520, 739, 746, 619, 287, 91, 456, 614, 617; 361/1, 452, 461, 478, 778

[56] References Cited

U.S. PATENT DOCUMENTS

| 1,951,012 | 3/1934 | Finney | 318/461 |
| 2,207,136 | 7/1940 | Veatch | 210/150 |
| 3,839,198 | 10/1974 | Shelef | 210/150 |
| 5,096,588 | 3/1992 | Albertson | 210/150 |

FOREIGN PATENT DOCUMENTS 3310692 12/1988 Japan ................... 210/145

OTHER PUBLICATIONS

Bulletin No. 9041 "The Dorrco Hydro-Treator"; Dorr-Oliver Incorporated, Stamford, Connecticut, Copyright 1952.

Primary Examiner—Mary Lynn Theisen
Assistant Examiner—Joseph Drodge
Attorney, Agent, or Firm—Trask, Britt & Rossa

[57] ABSTRACT

The present invention deals with wastewater treatment systems, and more particularly with trickling filter systems using distribution tubes or arms rotating about a central point above filter beds to distribute wastewater thereto. The present invention comprises an auxiliary or backup motor drive mechanism for a rotary wastewater distributor and includes a prime mover, preferably an electric motor, a transmission system, preferably a sprocket and chain drive, and a sensing system to turn the auxiliary drive system on when flow rates are too low to maintain the normal hydraulically driven rotation of the distributor. The auxiliary drive system further comprises protective mechanisms to turn the prime mover off whenever speeds afforded by the wastewater flow are adequate for proper distributor operation or whenever the auxiliary drive system is overloaded due to a failure of rotation of the distributor.

20 Claims, 5 Drawing Sheets

ROTARY DISTRIBUTOR/AUXILIARY BACKUP DRIVE MECHANISM FOR TRICKLING FILTER SYSTEMS

BACKGROUND OF THE INVENTION

1. Field

The present invention relates to drives for rotary distributors for wastewater filtration systems.

2. State of the Art

Trickling filter systems, which use a layered filter bed of stones, have been employed as one of the principal stages of sewage treatment for many years. In recent years, a plastic filter media, sometimes of a honeycomb design, has replaced stone in the filter bed. The raw sewage liquor is sprinkled over the top of the bed by a distribution system including pipes (also called tubes or arms) extending from a centerwell as horizontal rotating arms which discharge the sewage or other waste liquor through spaced ports distributed along their length. Systems may use double or multiple arms comprised of long tubes supported by overhead tie-rods and spaced apart by horizontal tie-rods. The distributor pipes are typically fed from their radially inward ends through a centerwell or mast. As the distribution process occurs, the liquor is discharged horizontally from discharge ports located on the same side of each of the distribution pipes. As a result, at substantial flow rates, an inertial reaction of the distribution pipes to the fluid flow jetting out behind the pipe causes the distribution system to rotate. By proper placement of the discharge ports, a distribution system can be designed to distribute the liquor evenly over the top of the bed. As the liquor passes down through the filter bed, biological degradation processes the sewage and liquifies the suspended solids.

As a distributor system operates, the flow of liquid through the system is subject to several variations. The total volumetric flow rate may fluctuate with time between reasonably high flows and extremely low flows. Since the motion of the distributor pipes or arm is dependent upon the jetting action of the exiting liquid, at low flows the jetting may be insufficient to overcome the friction within the system. If the system stops, the friction changes from a dynamic coefficient of friction to a static coefficient of friction. Static coefficients of friction are typically larger than dynamic coefficients of friction, so a system which has ceased to rotate is more difficult to restart. There is a need for a support system which will insure the rotation of a sewage distribution system whenever extremely low flow conditions result in insufficient hydraulic forces to overcome the system frictional forces.

During the time that a distribution system is not properly rotating, wastewater treatment is not effectively taking place. In the past, the operators of wastewater distribution systems which failed, due to malfunction, low flow rates or other reasons, might simply pass their discharges through the bed within a very small area and thus not provide the biological degradation which constitutes sewage treatment processes. In previous decades, such a failure could be ignored or might have been ignored. Today, stricter administrative regulation of the quality of discharge of untreated wastewater effectively precludes a municipality or industrial treatment plant from discharging untreated sewage or inadequately treated sewage. Fines and other civil and criminal sanctions for violations require that some means be developed to maintain proper operation of treatment systems with minimal attendance by operators.

Moreover, as populations in some urban centers increase, with the attendant load increases on wastewater treatment plants, a desire for optimized throughput through each existing filter bed becomes more desirable to avoid the necessity for new installations. Also, real estate purchased and dedicated to treatment facilities becomes more expensive, if not impossible, to enlarge in population centers where cities have built up around their treatment plants. That is, if a treatment plant has limited existing real estate, it is desirable to minimize costs by stacking more filter beds vertically or by placing them in closer proximity, in a single treatment works to avoid the costs of land acquisitions. Such an approach, however, requires more system sophistication and enhanced monitoring to prevent failure of any individual filtering bed. Thus, enhanced system reliability has economic advantages in allowing more treatment beds to be installed within less area and operated by fewer people per unit and also provides the ability to increase system throughput and reduce system downtime.

As noted above, wastewater treatment systems of the trickling filter or filter bed variety use a rotating array of distribution pipes to spread liquor over the top of the filter bed. Two means have been developed for rotating these distribution systems or networks. The first uses the jetting action of the fluid being discharged to cause (via inertial reaction) horizontal rotation of the "star" of radial distribution pipes or arms turning about a center mast, whereas the second uses a motor operating either from the center of the star or along a track at the periphery of the star to cause rotation. The difficulty with the former approach in the modern age is lack of reliability when distribution arms or discharge ports become plugged or when discharge rates become so low as to limit rotation speeds or bring the system to a stop. The difficulty with the latter mechanism is the inordinate cost of driving the star. At the slow rotational speeds of such stars, as the distribution pipes discharge to the filter bed, gearing and mechanical losses can be substantial, causing a significant power cost for system rotation in addition to pumping costs.

Finally, the reliability of a motorized drive system utilized as the primary power source is not necessarily better than that of a hydraulically driven (jetting or inertial reaction) system. Mechanical failures can occur in motor drives and gear trains as well as in hydraulic systems. Thus, a need exists for a reliable system which provides minimal operating costs. Little development has occurred for decades in this area of wastewater treatment equipment.

A typical hydraulically driven trickling filter sewage distribution systems is disclosed in U.S. Pat. No. 2,403,695 by Walker. The sewage is pumped to and through a central distribution pedestal from which numerous arms or tubes radiate, and is then distributed out through the arms where it is discharged horizontally through specifically spaced discharge openings out over the filter bed. The inertial reaction of the rotating distribution tubes to the discharge velocity of the liquor drives the rotary distributor about its axis at the center of the pedestal. At low flows or with obstructions, friction halts rotation of such a system. One motorized type of drive system is typically described by Hartley, U.S. Pat. No. 904,325. In the Hartley device, a monorail was anchored on the top of the outer wall of the filter bed. A motor at the end of a distribution tube travels along the rail, slowly rotating the array of tubes. No hydraulic benefit is achieved from the discharge of the sewage liquor from the distribution tubes. The advantage sought by Hartley was a positive drive achieved at the cost of continuous operation of an electrical drive mechanism. Other motorized systems in the prior art, as disclosed in FIG. 5 of the Walker patent, employ a motor at the pedestal in the center of the distribution system. In either arrangement, experience in the art has shown such systems to require substantial maintenance, which still cannot prevent periodic breakdowns due to the continual stress placed on the drive system components.

SUMMARY OF THE INVENTION

The present invention overcomes the foregoing difficulties by providing enhanced dependability by use of an auxiliary or backup motor drive system for the occasions when a hydraulic inertial reaction drive system fails completely, or permits rotational speed reductions of a distribution system below an acceptable minimum. In addition, the invention provides a warning and automatic shutoff whenever the auxiliary drive is overloaded due to a serious malfunction such as a binding up of the bearing surfaces of the distributor. That is, when the distribution system difficulty is not low flow but a mechanical failure, the auxiliary drive can protect itself by shutting down and sending a signal to operators to notify them of the difficulty. Thus, the backup drive system comprises a positive drive which will maintain at least a minimum speed by the distributor system while maintaining the economy of prior art hydraulic inertial reaction drive systems using horizontal discharge of the liquor from the distribution tubes as the primary drive. With this additional economy and reliability, a higher density filter farm can be constructed by municipal and industrial operators. In addition, the efficiency of the system can be relied upon so that higher throughputs can be routinely expected with less margin of safety required in filtering capacity, such safety factor being provided instead by the auxiliary drive system of the present invention. This reduction in the probability of unattended system failure provides enhanced security from fear of violations, penalties, and environmental damage which might otherwise result from the use of prior art systems.

The present invention, in its preferred form, comprises a motor drive system having a prime mover, an overrunning clutch connected to the prime mover to drive a system for engagement with the rotating distributor system, preferably a sprocket and chain system. The overrunning clutch allows the sprocket system, which is engaged to a chain fixedly mounted on a diameter within the rotating distributor, to run faster than the motor drive if hydraulic flow conditions so dictate. The motor drive system is further provided with a sensor which detects motion of the drive sprocket and energizes the motor only when the drive sprocket speed, in an idling mode following the hydraulically drive motion, reaches the defined minimum tolerable speed, or low speed setpoint. At the low speed setpoint, the sensor will energize the motor to accelerate and maintain the sprocket at the minimum acceptable rotational speed setpoint. Whenever increased hydraulic forces accelerate the rotating distributor and thus the drive sprocket above a high speed setpoint, the sensor will actuate a relay which will de-energize the motor and allow the hydraulic forces to operate the distributor independently. So long as the driven sprocket is rotated above the high speed setpoint, the sprocket will freewheel, with the overrunning clutch (unidirectional) freeing the sprocket system from the motor and allowing the motor to sit idle. The system is further provided with a shutdown protection means if a high torque condition occurs. That is, when a low speed is sensed and the system attempts to energizes the motor to drive the system at proper operational speed, if the motor has too much current draw or too high a torque for an extended period of time, indicating some mechanical fault, a sensor detects that load and shuts off the system. The system must be manually reset after the reason for the high torque condition has been resolved by the operator.

DETAILED DESCRIPTION OF THE PREFERRED EMBODIMENT

Referring to FIGS. 1 through 4, the auxiliary drive system 10 of the present invention comprises an electric motor 12, driving a rotation clutch 14 which is of an "over-running" type. The preferred design of clutch 14 is a ball or roller clutch and back stop mechanism. Suitable clutches of this design are commercially available from Odin Corporation of Indianapolis, Ind., as ODIN Free Wheeling, ball-type clutches and back stops. The motor 12 is further associated with a sensor 16 capable of detecting the movement of the rotary hardware such as sprockets which are idling along as hydraulic pumping rotates the star of distribution tubes. The sensor 16 is not limited to detection of motion driven by hydraulics, but observes the rotational speed of the distribution system at all times whether driven by the auxiliary drive system 10 or by the hydraulics. The rotation clutch 14 has a first sprocket 18 attached to its lower extremity, which sprocket 18 drives a chain 20 operating in a horizontal plane to engage a driven sprocket 22, chain tensioner 23 maintaining a desired tension in chain 20. An idler shaft 24 supported on bearings in mounting brackets 26 and 28 rotates with driven sprocket 22, idler shaft 24 rotating about a vertical axis 30. At the upper end of the idler shaft 24, a sensor target 32 is fixedly mounted to rotate with the idler shaft 24 such that rotation thereof can be detected by sensor 16. The sensor 16 activates the auxiliary drive system 10 by energizing the motor 12 if the speed of the sensor target 32 is too slow for proper operation of the sewage distribution system.

A third sprocket 36 is secured at the lower end of idler shaft 24 so as to turn continually with the idler shaft 24. The teeth of third sprocket 36 engage a driven chain 38 fixedly attached to a drive circumference 40 which is part of the structure of the centerwell 42. The centerwell 42 and its associated centerwell support structure 44 form a central support element for the overall rotating distribution system 46 which is rotatably disposed on mast support structure 47. Protective shroud 49 is secured to and extends from mast support structure 47 outwardly over drive circumference 40 and downwardly below the upper edge thereof. The rotating distribution system 46 providing the load for the auxiliary drive system 10, comprises all of the distribution tubes 48 or arms with their flow spreaders or discharge ports 50 and supporting tie-rods 52 to form the main hydraulic system which rotates to distribute liquid and to rotate the distribution system 46 over filter bed 54 during normal operation.

The drive circumference 40 is the connecting location for the auxiliary drive system 10 and the rotating distribution system 46. During conventional operation of the rotating distribution system 46, the liquor proceeds vertically upward through the centerwell 42 from whence it is distributed horizontally through the distribution tubes or arms 48 and out through the flow spreaders or discharge ports 50. The discharge through the trailing edge flow spreaders or discharge ports 50 (see FIG. 3) urges the distribution tubes or arms 48 in an opposing direction, thus rotating the distribution system 46 about its principal axis 58. Leading edge flow spreaders or discharge ports 50' are also commonly used to limit the maximum rotational speed of the distribution system 46.

When flow through flow spreaders or discharge ports 50 is insufficient to maintain proper rotational speeds of the rotating distribution system 46, then sensor 16 detects that the speed of sensor target 32 is at the minimum allowable setpoint. The auxiliary drive system 10 is then commanded by the sensor 16, through associated analog or digital electrical control means well known in the art, to activate the motor 12 to provide power to rotation clutch 14 to drive the entire system at an appropriate speed above the minimum allowable setpoint. If the speed of the sensor target 32 as sensed by sensor 16 does not come up to operational speed in a predetermined period of time after activation of motor 12, then the control means will command the auxiliary drive system 10 to shut down and will trigger an alarm to notify operation personnel that the auxiliary drive system 10 cannot cause the distribution system to operate properly. Likewise, motor 12 is provided with a suitable torque sensor including associated analog or digital electrical control means as known in the art, which detects whether motor 12 is being overloaded. If motor 12 is being overloaded, then the torque sensor commands the auxiliary drive system 10 to shut the motor 12 off and an alarm is signaled to notify operators that some mechanical malfunction (rather than an insufficient flow rate from the flow spreaders or discharge ports 50) is responsible for the cessation of rotating distribution system 46.

Figure 5:
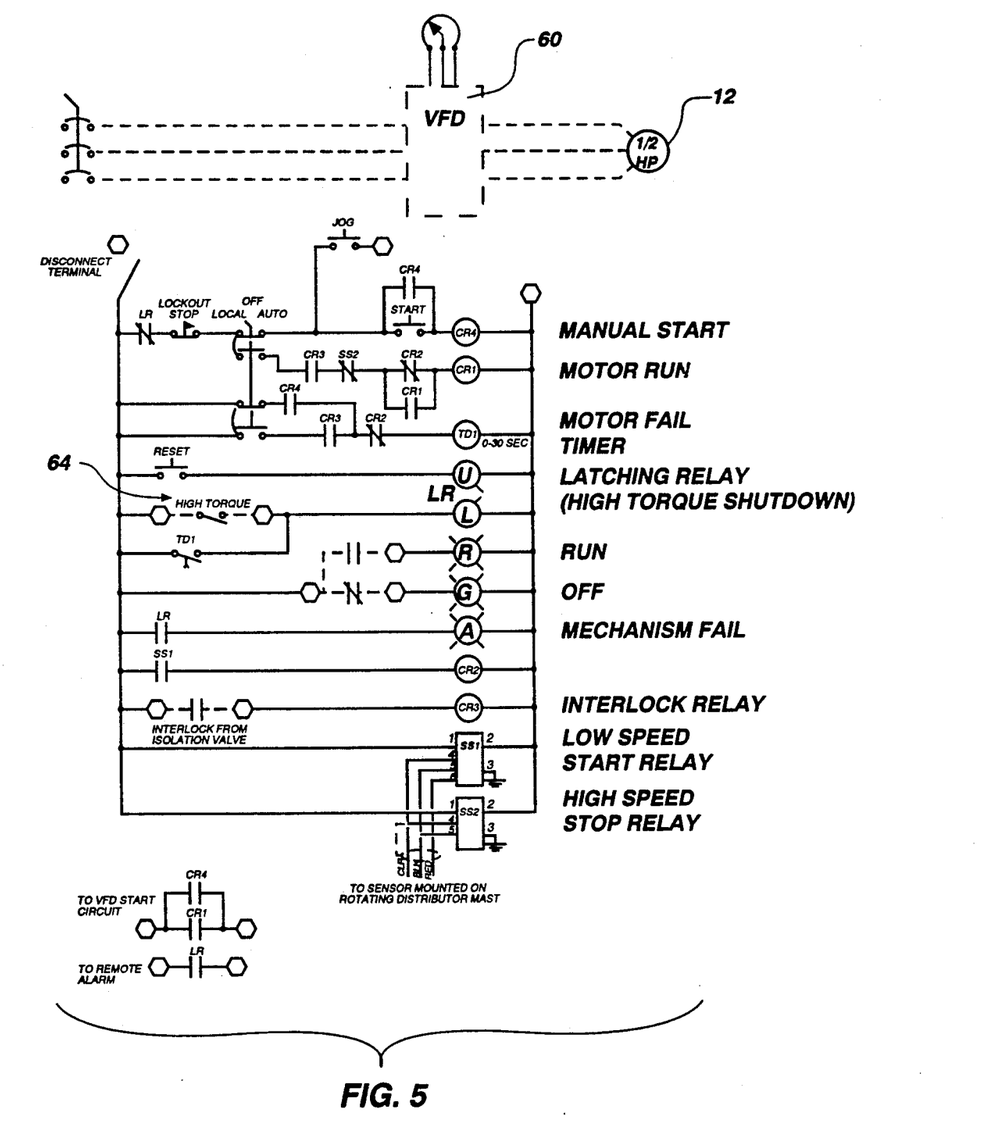
FIG. 5 is a wiring diagram for the auxiliary drive mechanism of the present invention.
Figure 6:
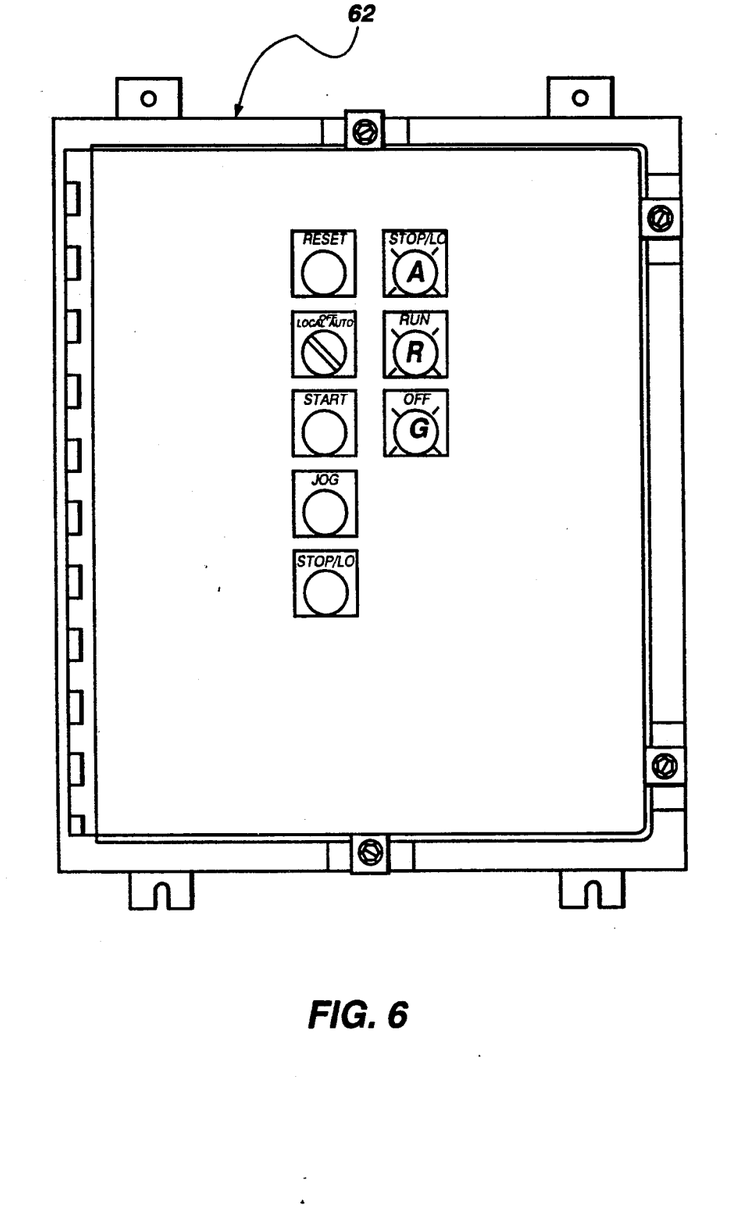
FIG. 6 is a front elevation of an exemplary control panel employed in conjunction with the wiring diagram of FIG. 5.

Referring now to FIGS. 5 and 6 of the drawings, it can be seen how the various electrical control, display and sensor functions are interrelated in the preferred embodiment of the invention. It should be noted, as shown at the top of FIG. 5, that the preferred electric motor 12 as employed in the present invention is a one-half ($\frac{1}{2}$) horsepower three-phase motor controlled via variable frequency drive unit 60. The mechanical advantage afforded by the sprocket and chain drive, in conjunction with the low rotational friction provided by the bearing supporting the distribution system 46, permits use of such a relatively low-power motor. If desired, an additional gear reduction mechanism may be deployed between motor 12 and clutch 14.

Figure 1:
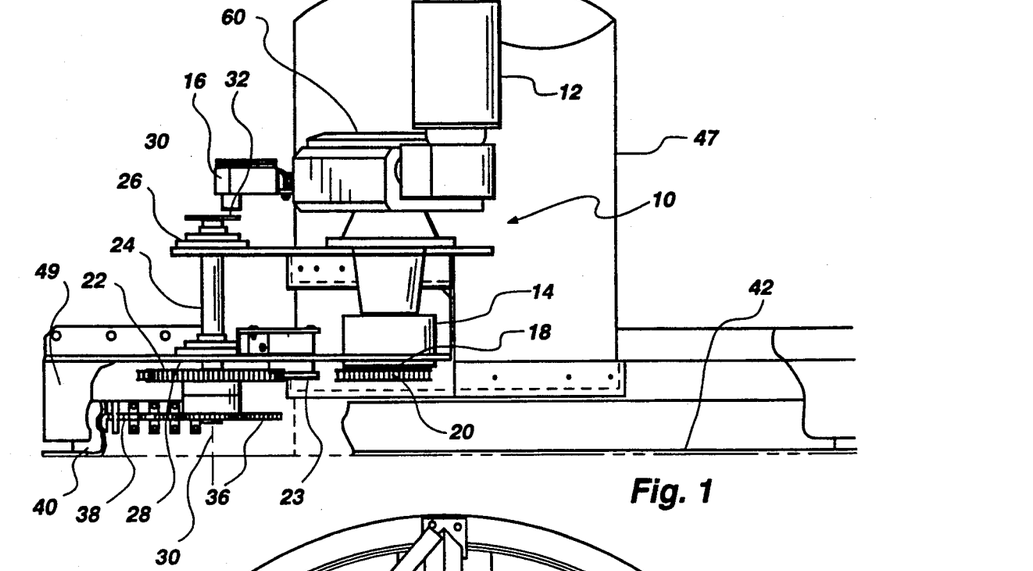
FIG. 1 discloses the auxiliary drive mechanism of the present invention in enlarged elevation view.
Figure 2:
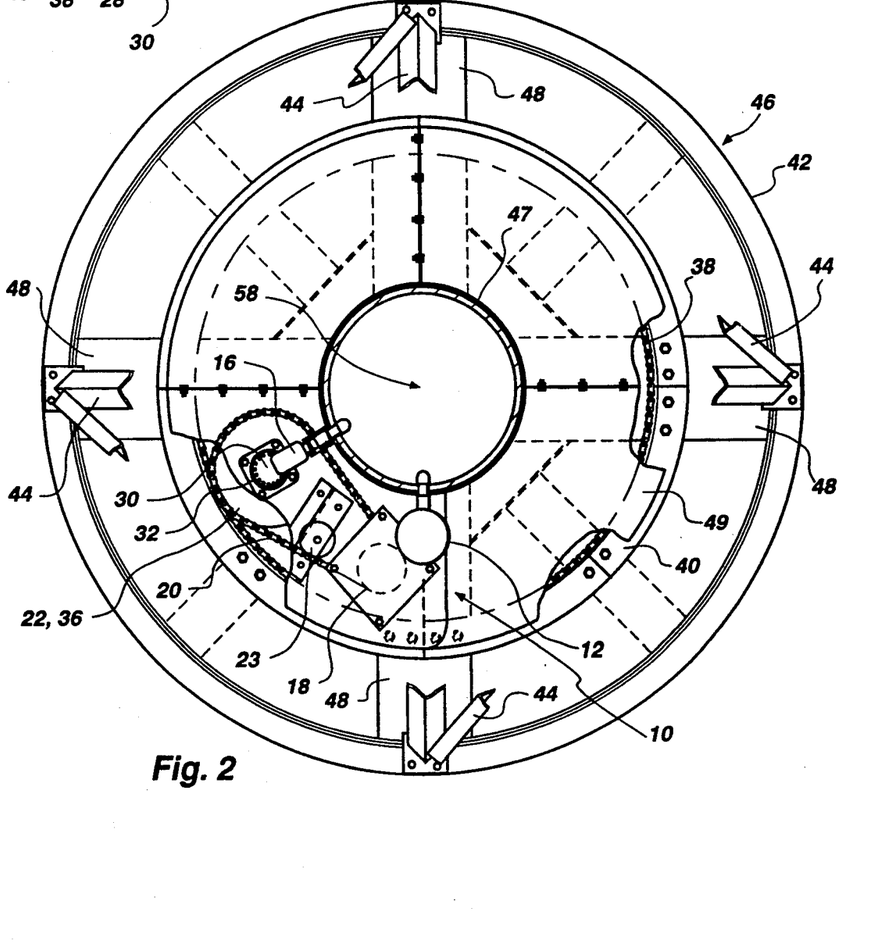
FIG. 2 shows a cutaway plan view of the auxiliary drive mechanism of the present invention.
Figure 3:
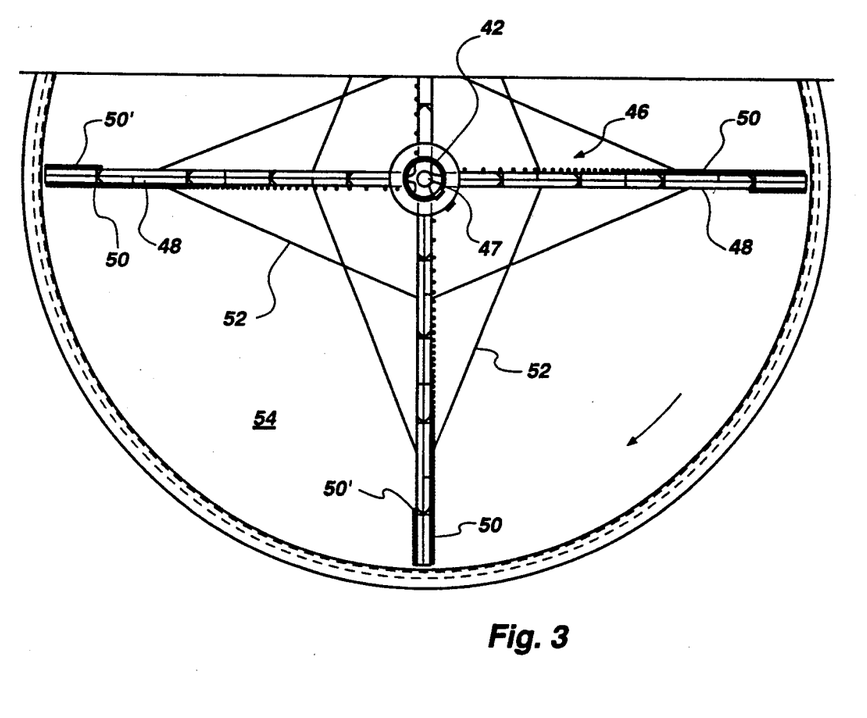
FIG. 3 is a partial top plan view of a sewage treatment plant filter bed system incorporating the present invention, showing the center pedestal with rotating distribution tubes extending therefrom radially in a star, supported and stabilized by tie-rods over the filter bed.
Figure 4:
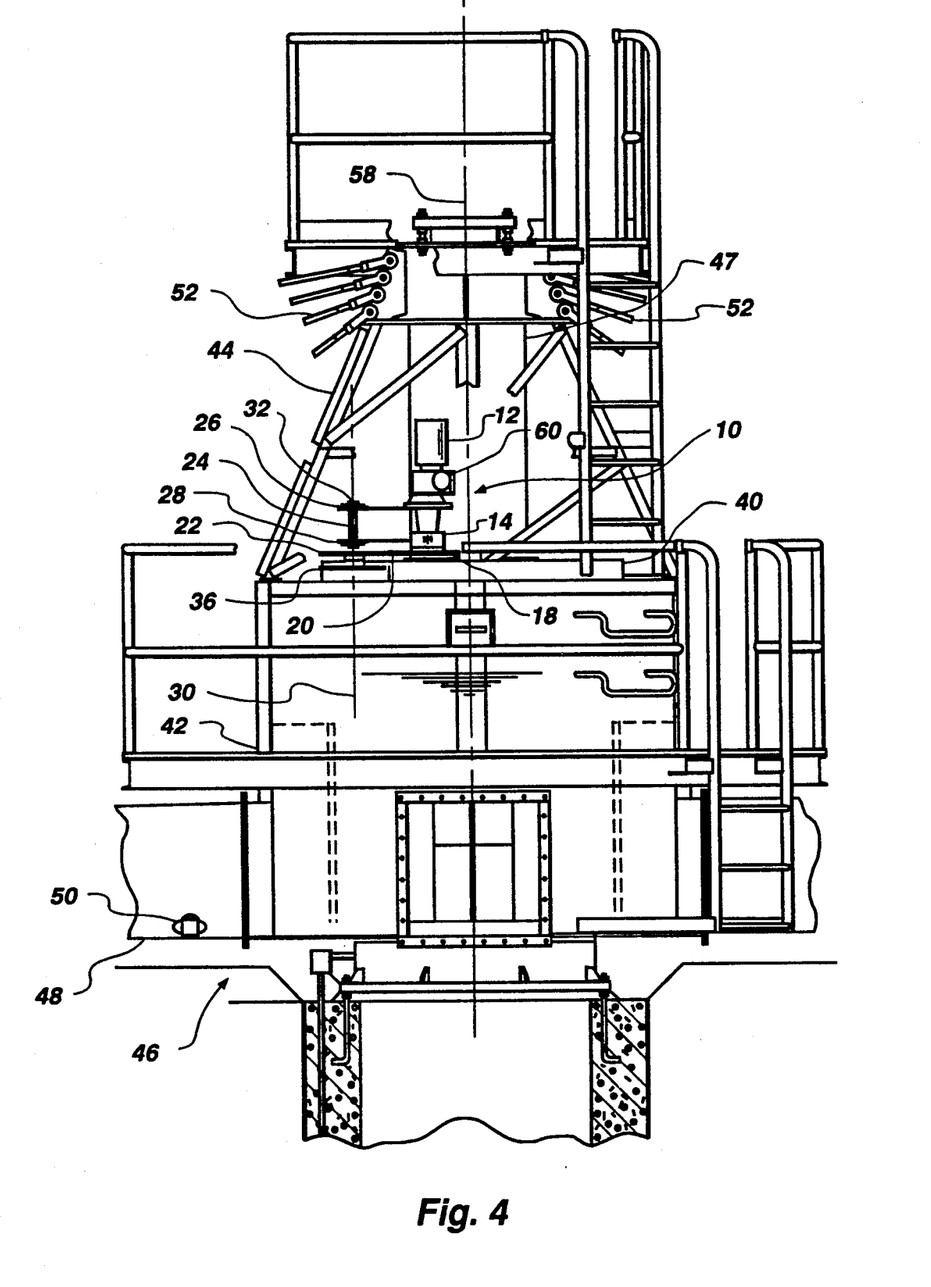
FIG. 4 is an elevation of the center assembly of a rotary distributor incorporating the auxiliary drive system of the present invention.

Control panel 62 as shown in FIG. 6 of the drawings depicts various control input and display functions which may easily be correlated to similarly labeled electrical components, wiring and combinations thereof in FIG. 4. The broken lines on FIG. 5 indicates, for convenience of the reader, those wiring elements external to control panel 62. It should be understood that the diagram of FIG. 5 and the panel of FIG. 6 are exemplary only, and the invention is not so limited to these specific configurations of elements.

Referring to FIG. 5, the acronym "CR" represents "control relay"; "TD," "time delay relay"; "LR," "latching relay"; and "SS," "speed switches." The "RUN," "OFF," and "FAIL" displays as shown on FIGS. 4 and 5 employ red, green, and amber displays, respectively. The "START" switch is employed in conjunction with the three-way "OFF/AUTO/LOCAL" switch to activate auxiliary drive system 10 from the control panel when the latter switch is in the "LOCAL" mode. The "AUTO" mode subjects the auxiliary drive system 10 to an interlock with an isolation valve which opens only when the pumps impelling sewage liquor through the distribution system 46 are activated. The "JOG" switch will actuate the motor 12 of auxiliary drive system 10 for as long as it is depressed, and may be employed to facilitate the initial rotation of distribution system 46 after a shutdown. The "STOP/GO" switch shuts off the drive system 10 and operates as a lockout control to the "OFF/AUTO/LOCAL" switch so that the system may not be inadvertently activated. The time delay relay, TD1, may be set for a time period from 0 to 30 seconds to shut down motor 12 if it does not maintain distribution system 46 above the low speed setpoint in the prescribed period of time after being energized. The latching relay LR is a mechanical latch which shuts down motor 12 in response to a high torque sensor 64 associated therewith. The "RESET" switch must be depressed in order to reset the latching relay (LR) after system shutdown due to the sensing of a high torque condition.

The description of the present invention as disclosed to this point is the preferred embodiment. However, it is conceivable that electric motor 12 could be replaced by a prime mover of any suitable type, including fossil fuel fired engines or other alternately fueled systems. Alternate prime movers could serve equally well. Likewise, the sensor 16 in the preferred embodiment comprises a magnetic sensor, and the sensor target 32, a magnetic disc. Nevertheless, printed circuit resolvers, limit switches, counters of various varieties, and mechanical linkages as known in the prior art can be configured to serve this function. That is, some detection means can be located in the system to provide a measurement of rotational speed, and the exact means is not critical to the operation of the present invention.

Numerous other mechanisms including inductive sensors, infrared detectors, or other light detectors in different electromagnetic bands could serve equally well in a sensor function in the present invention and are envisioned to do so within this disclosure. Additional control circuitry to sense and command as well as gear trains and speed reductions to maintain proper connection between motor 12 and rotation clutch 14 may be employed. Torque sensor 64 could be a current sensor to detect an integrated electrical current draw over an extended period of time indicating high torque, or it could be some mechanical sensor such as strain gauges to detect an inordinate load being put on the motor 12.

In some systems, such as a filter tank farm, a hydrostatic drive from a central power source could eliminate the need for multiple motors 12. Use of a prime mover of any such variety is comprehended in this application. Likewise, the speed reduction achieved by sprockets 18, 22, and chains 20 and 38 might be replaced with gear systems, wheels or belt drives.

These and many other additions, deletions and modifications to the preferred embodiment as disclosed herein may be made without departing from the spirit and scope of the claimed invention.

We claim:

1. In a rotating wastewater distribution system constructed and arranged to be normally driven at or above a predetermined rotational speed by hydraulic flow, an auxiliary drive apparatus, comprising:
    a prime mover;
    means for sensing the speed of rotation of said wastewater distribution system and for causing said prime mover to be activated when said sensed speed is at or below said predetermined rotational speed; and
    transmission means for connecting said activated prime mover to drive the wastewater distribution system.

2. The apparatus of claim 1 wherein said prime mover is an electric motor.

3. The apparatus of claim 1 wherein said transmission means comprises a system of sprockets and chains.

4. The apparatus of claim 1 wherein said transmission means comprises a gear train.

5. The apparatus of claim 1 wherein said transmission means includes a sprocket driving a chain fixedly attached to said rotational wastewater distribution system.

6. The apparatus of claim 1 wherein said means for sensing comprises a magnetic detector.

7. The apparatus of claim 1 wherein said means for sensing comprises an electrical inductance sensor.

8. The apparatus of claim 1 wherein said means for sensing comprises an electronic printed circuit resolver.

9. The apparatus of claim 1 wherein said means for sensing is adapted to detect a target having a magnetic character.

10. The apparatus of claim 1 further including control means to command said prime mover in response to signals from said means for sensing.

11. The apparatus of claim 1 wherein said means for sensing includes means for activating an alarm subsequent to activation of said prime mover in response to said sensed speed remaining below said predetermined point.

12. The apparatus of claim 1 wherein said means for sensing further includes sensors to detect at least one parameter from the group consisting of: motion, torque, and electrical current draw of said prime mover.

13. The apparatus of claim 1, wherein said means for sensing and for causing activation of said prime mover is also adapted to cause deactivation thereof in response to said sensed speed rising above a second, higher predetermined point.

14. In a rotating wastewater distribution system constructed and arranged to be normally driven at or above a predetermined rotational speed by hydraulic flow, an auxiliary drive apparatus, comprising:
    a prime mover;
    means for sensing the speed of rotation of said wastewater distribution system and for causing said prime mover to be activated when said sensed speed is at or below said predetermined rotational speed;
    transmission means for connecting said activated prime mover to drive wastewater distribution system; and
    overrunning clutch means for automatically disengaging said auxiliary drive apparatus from the rotating wastewater distribution system in response to said distribution system being driven at or about substantially said predetermined speed by said hydraulic flow.

15. The apparatus of claim 14 wherein said overrunning clutch comprises a ball clutch.

16. A sensor system adapted for control of a rotating wastewater distribution system in a filter bed type wastewater treatment plant, said rotating wastewater distribution system constructed and arranged to impose a torque load upon a prime mover for supplementing rotation torque generated by hydraulic flow, said sensor system comprising:
    a motion detector means to signal motion of said rotating wastewater distribution system;
    a torque detector means to signal the torque load on a prime mover driving said rotating wastewater distribution system; and
    control means responsive to said motion detector signal and said torque detector signal for activating and deactivating said prime mover.

17. A method of operating a rotary waste liquid distribution system for a filter bed, comprising:
    providing said distribution system, including a plurality of radially extending arms emanating from and rotatable about a center point;
    providing an auxiliary drive means for said distribution system;
    pumping said liquid through said arms;
    rotating said arms at a speed in response to said pumping;
    measuring the speed of rotation of said arms; and
    activating said auxiliary drive means in response to said measured speed falling below a first predetermined speed.

18. The method of claim 17, further including the step of deactivating said activated auxiliary drive means in response to said measured speed rising above a second, higher predetermined speed.

19. A method of operating a rotary waste liquid distribution system for a filter bed, comprising:
    providing said distribution system, including a plurality of radially extending arms emanating from and rotatable about a center point;
    providing an auxiliary drive means for said distribution system;
    pumping said liquid through said arms;
    rotating said arms in response to said pumping;
    measuring the speed of rotation of said arms;
    activating said auxiliary drive means if said measured speed falls below a first predetermined speed; and detecting the torque load on said auxiliary drive means after activation thereof, and deactivating said auxiliary drive means in response to said load rising above a predetermined point.

20. A method of operating a rotary waste liquid distribution system for a filter bed, comprising:
providing said distribution system, including a plurality of radially extending arms emanating from and rotatable about a center point;
providing an auxiliary drive means for said distribution system;
pumping said liquid through said arms;
rotating said arms in response to said pumping;
measuring the speed of rotation of said arms;
activating said auxiliary drive means if said measured speed falls below a first predetermined speed; and
deactivating said auxiliary drive means in response to a failure of said measured speed to rise above said first predetermined speed after a predetermined time delay.

* * * * *

UNITED STATES PATENT AND TRADEMARK OFFICE
CERTIFICATE OF CORRECTION

PATENT NO. : 5,167,833

DATED : December 1, 1992

INVENTOR(S) : Solum, et al.

It is certified that error appears in the above-identified patent and that said Letters Patent is hereby corrected as shown below:  On the title page:

Please add the following U.S. Patent Documents in the References cited on the front page of the above identified patent:

| Document # | Date | Name | Class/Subclass |
|---|---|---|---|
| 904,324 | 11/1908 | J.W. Hartley | 210/520 |
| 2,403,695 | 07/1946 | J.D. Walker | 210/156 |
| 3,833,126 | 09/1974 | Schochet, et al. | 210/531 |
| 4,055,494 | 01/1984 | Robert C. Emmett | 210/531 |
| 4,424,130 | 01/1984 | Donald L. King | 210/531 |

Please add the following document in the References Cited - Other Publications on the front page of the above-identified patent:

"ODIN Free Wheeling Light Duty, Ball Type Clutches and Back Stops", December, 1985.

Signed and Sealed this

Fifth Day of October, 1993

Attest:

BRUCE LEHMAN

*Attesting Officer*     *Commissioner of Patents and Trademarks*